(12) United States Patent
Nose et al.

(10) Patent No.: US 6,372,677 B1
(45) Date of Patent: Apr. 16, 2002

(54) LOW THERMAL EXPANSION AND HIGH RIGIDITY CERAMIC SINTERED BODY

(75) Inventors: Tetsuro Nose, Futtsu; Hidehiko Morita, Tokyo; Fumiaki Takahashi, Futtsu, all of (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/701,911

(22) PCT Filed: Mar. 31, 2000

(86) PCT No.: PCT/JP00/02087

§ 371 Date: Jan. 5, 2000

§ 102(e) Date: Jan. 5, 2000

(87) PCT Pub. No.: WO00/59844

PCT Pub. Date: Oct. 12, 2000

(30) Foreign Application Priority Data

Apr. 6, 1999 (JP) ................................................ 11-98454

(51) Int. Cl.⁷ .......................... C04B 35/18; C04B 35/19; C04B 35/20
(52) U.S. Cl. ........................ 501/119; 501/112; 501/120
(58) Field of Search ............................ 501/112, 119, 501/120

(56) References Cited

U.S. PATENT DOCUMENTS 4,595,662 A * 6/1986 Mochida et al. ............ 501/15

FOREIGN PATENT DOCUMENTS

| JP | 52-145416 | 12/1977 |
| JP | 56-109869 | 8/1981 |
| JP | 58-125662 | 7/1983 |
| JP | 61-72679 | 4/1986 |
| JP | 10-53460 | 2/1998 |

OTHER PUBLICATIONS

Notice Of Reasons For Rejection For Japanese Patent Application No. 11–98454 (98454/1999) with English translation (Feb. 21, 2000).

* cited by examiner

Primary Examiner—David Brunsman
(74) Attorney, Agent, or Firm—Kenyon & Kenyon

(57) ABSTRACT

The low thermal expansion and high rigidity ceramic sintered body of this invention is characterized by assuming as a crystal structure a hexagonal close-packed structure and substantially comprising solid solution crystal grains represented by the formula: $Mg_aLi_bFe_cAl_dSi_eO_f$ (wherein a is in the range of 1.8 to 1.9, b is in the range of 0.1 to 0.3, c is in the range of 0 to 0.2, d is in the range of 3.9 to 4.1, e is in the range of 6.0 to 7.0, and f is in the range of 19 to 23). It is further characterized by the solid solution crystal grains having lattice constants in the ranges, $a_0$ in the range of 9.774 to 9.804 Å and $c_0$ in the range of 9.286 to 9.330 Å, the relative density of the sintered body being of not less than 98%.

3 Claims, No Drawings

LOW THERMAL EXPANSION AND HIGH RIGIDITY CERAMIC SINTERED BODY

This application is 371 of PCT/JP00/02087 filed on Mar. 31, 2000.

TECHNICAL FIELD

This invention relates to a low thermal expansion and high rigidity ceramic sintered body which is excellent in thermal stability and specific rigidity and usable in members of high precision control device, members of optical devices, and members demanding high thermal shock resistance which invariably abhor changes in size and changes in shape due to a thermal expansion or contraction induced by changes in temperature.

BACKGROUND ART

As materials which have been heretofore used under conditions demanding thermal stability, low thermal expansion metallic materials such as an Invar alloy (Fe-Ni type) and a super Invar alloy (Fe-Ni-Co type), low thermal expansion glasses such as quartz glass ($SiO_2$) and quartz glass containing titanium oxide ($SiO_2$-$TiO_2$), and low thermal expansion ceramics such as aluminum titanate ($TiO_2 \cdot Al_2O_3$), eucryptite ($Li_2O \cdot Al_2O_3 \cdot 2SiO_2$), β-spundumene ($Li_2O \cdot Al_2O_3 \cdot 4SiO_2$), petalite ($Li_2O \cdot Al_2O_3 \cdot 8SiO_2$), and cordierite ($2MgO \cdot 2Al_2O_3 \cdot 5SiO_2$) have been known. These materials are excellent in thermal stability because they have such a small thermal expansion coefficient as of not more than $1.2 \times 10^{-6}$/°C. in the neighborhood of a room temperature. Nevertheless they usually have a specific rigidity expressed by a ratio of a Young's modulus to a specific gravity such values lower than 45 $GPa/g/cm^3$ and, when used in members demanding dimensional stability and thermal shock resistance, therefore, are at a disadvantage in being readily deformed by an external force or under its own weight, offering only a low resonance frequency to the vibration of the relevant member, and generating a large amplitude.

The Invar alloy, for example, has a relatively small thermal expansion coefficient of about $1.2 \times 10^{-6}$/°C. at near a room temperature, a Young's modulus of 144 GPa, a value rating high among low thermal expansion materials, a large specific gravity, and a small specific rigidity of 18 $GPa/g/cm^3$. The super Invar alloy, though enjoying a small thermal expansion coefficient of $0.13 \times 10^{-6}$/°C., is deficient in mechanical stability because of a small specific rigidity of 17 $GPa/g/cm^3$.

The quartz glass has a small thermal expansion coefficient of $0.48 \times 10^{-6}$/°C. and such an insufficient specific rigidity as of 33 $GPa/g/cm^3$. The quartz glass containing titanium oxide has an extremely small thermal expansion coefficient of about $0.05 \times 10^{-6}$/°C. and is deficient in mechanical stability because of an insufficiently high specific rigidity of 33 $Gpa/g/cm^3$.

Further, the aluminum titanate manifests negative expansion as evinced by a thermal expansion coefficient of $-0.8 \times 10^6$/°C. and has an extremely small specific rigidity of about 2 $GPa/g/cm^3$. The lithium aluminosilicate type low thermal expansion ceramics such as eucriptite, β-spodumene, and petalite have a small thermal expansion coefficient in the range of $-5$ to $1 \times 10^{-6}$/°C., a not very high specific rigidity of about 35 $GPa/g/cm^3$, and are deficient in mechanical stability. The compact sintered body of cordierite, though excelling various low thermal expansion materials mentioned above by exhibiting a specific rigidity of about 50 $GPa/g/cm^3$, has a thermal expansion coefficient of $0.5 \times 10^6$/°C., which is not deserving to be called sufficiently low.

The invention described in JP-A-61-72,679, with a view to reducing a thermal expansion coefficient of cordierite capable of producing a relatively high specific rigidity, discloses a method which consists in attaining coexistence of a cordierite phase with a β-spodumene phase as crystal phases and an auxiliary crystal phase as of spinel. This method has been reported to be capable of lowering a thermal expansion as compared with a simple phase of cordierete. With the same view as above, the invention described in JP-A-10-53,460 discloses a compact ceramics allowing the coexistence of a petalite phase, a spodumene phase, and a cordierite phase in a crystal phase. This compact ceramics has been demonstrated to excel in thermal shock resistance. Further, the invention described in JP-A-58-125,662 discloses a method for producing a ceramics allowing the coexistence of zircon in cordierite by adding a zirconium compound and a phosphorus compound to the cordierite. The sintered body obtained by this method has been reported to excel in thermal shock resistance. These materials, however, do not deserve to be rated as having a sufficiently low thermal expansion coefficient. As structural parts to be used for members in precision control devices, members in optical devices, and members demanding high thermal shock resistance, they cannot be said as having satisfactory thermal mechanical stability. Such has been the true state of the materials of interest.

Since conventional low thermal expansion ceramic materials are such that those having a small thermal expansion coefficient show a low specific rigidity and those having a high specific rigidity show no sufficiently low thermal expansion coefficient as described above, no low thermal expansion ceramic materials developed today have secured thermal stability such that the absolute value of thermal expansion coefficient does not exceed $0.1 \times 10^{-6}$/°C. while the specific rigidity is retained at a high level of not less than 45 $Gpa/g/cm^3$, for example. Thus, conventional low thermal expansion ceramic materials have been at a disadvantage in being deficient in thermal reliability for members in precision structures.

It is, therefore, an object of this invention to provide a low thermal expansion ceramic sintered body which excels in thermal and mechanical stability and manifests both high specific rigidity and low thermal expansion coefficient.

DISCLOSURE OF THE INVENTION

The low thermal expansion and high rigidity ceramic sintered body of this invention is characterized by assuming as a crystal structure a hexagonal close-packed structure and substantially comprising solid solution crystal grains represented by the formula: $Mg_aLi_bFe_cAl_dSi_eO_f$ (wherein a is in the range of 1.8 to 1.9, b is in the range of 0.1 to 0.3, c is in the range of 0 to 0.2, d is in the range of 3.9 to 4.1, e is in the range of 6.0 to 7.0, and f is in the range of 19 to 23).

In the ceramic sintered body mentioned above, the solid solution crystal grains may preferably have lattice constants in such ranges, i.e., $a_0$ in the range of 9.774 to 9.804 Å and $c_0$ in the range of 9.286 to 9.330 Å. The ceramic sintered body mentioned above may more preferably have a relative density of not less than 98%.

BEST MODES OF CARRYING OUT THE INVENTION

The present inventors, as a result of various studies, have found that in a sintered body formed solely of a single solid solution phase having as a crystal structure a hexagonal close-packed structure substantially represented by the formula: $Mg_aLi_bFe_cAl_dSi_eO_f$ excepting inevitable impurities, an absolute value of a thermal expansion coefficient can be controlled to not more than $0.1\times10^{-6}/°C$. and a specific rigidity to not less than 45 $GPa/g/cm^3$ by controlling the ratios of each the component element within respectively prescribed range. When a second phase such as an amorphous phase having a large thermal expansion coefficient or a spinel phase assuming a cubic crystal structure is present in addition to the solid solution phase represented by the formula: $Mg_aLi_bFe_cAl_dSi_eO_f$, the sintered body can not attain a sufficiently low thermal expansion coefficient. In order to obtain a sintered body having a high specific rigidity, it is desirable to incorporate a second phase such as an amorphous phase having a small specific rigidity, a β-spodumene phase having a cubic crystal structure, or a β-quartz solid solution phase in addition to the solid solution phase represented by the formula: $Mg_aLi_bFe_cAl_dSi_eO_f$.

The solid solution crystal grains according to this invention may be substantially represented by the formula: $Mg_aLi_bFe_cAl_dSi_eO_f$. In this formula, the variable "a" may be properly in the range of 1.8 to 1.9. If the variable "a" is smaller than 1.8, the shortage would be at a disadvantage in lowering a specific rigidity and tending to form a second phase such as a spodumene phase. If this variable "a" is larger than 1.9, the excess would be at a disadvantage in increasing a thermal expansion coefficient exceeding $0.1\times10^{-6}/°C$. The variable "b" may be properly in the range of 0.1 to 0.3. If the variable "b" is smaller than 0.1, the shortage would increase a thermal expansion coefficient exceeding $0.1\times10^{-6}/°C$. If the variable "b" is larger than 0.3, the excess would decrease a specific rigidity. Further, the variable "c" in the formula may be properly in the range of 0 to 0.2. If this variable "c" exceeds 0.2, the excess would increase a thermal expansion coefficient and decrease a specific rigidity. If the variable "c" is smaller than 0.05, the shortage would cause the produced sintered body to assume a white color. When the variable "c" is in the range of 0.05 to 0.2, the produced sintered body would assume a gray color. The variable "d" in the formula may be properly in the range of 3.9 to 4.1. If the variable "d" is smaller than 3.9, the shortage would decrease a specific rigidity. If the variable "d" exceeds 4.1, the excess would possibly form an alumina phase as a second phase and markedly increase a thermal expansion coefficient. The variable "e" in the formula may be properly in the range of 6.0 to 7.0. If the variable "e" is smaller than 6.0, the shortage would possibly induce persistence of a μ-cordierite crystal phase in the sintered body and would increase a thermal expansion coefficient. Conversely, if the variable "e" is larger than 7.0, the excess would markedly decrease a specific rigidity. The variable "f" in the formula may be properly in the range of 19 to 23. If the value "f" is smaller than 19, the shortage would increase a thermal expansion coefficient. If the value "f" is larger than 23, the excess would markedly lower a specific rigidity.

On the ground surface of the ceramic sintered body according to this invention, the lattice constants of the solid solution crystal grains analyzed by an X-ray diffraction method may be preferably within each the ranges, i.e., $a_0$ in the range of 9.774 to 9.804 Å and $c_0$ in the range of 9.286 –9.330 Å. If the lattice constant, $a_0$, is smaller than 9.286 Å or larger than 9.330 Å, the shortage or excess would invariably prevent a thermal expansion coefficient from acquiring a sufficiently small absolute value of not more than $0.1\times10^{-6}/°C$. near a room temperature.

Further, the ceramic sintered body according to this invention may properly have a relative density of not less than 98%. If the relative density is less than 98%, the shortage would be at a disadvantage in markedly decreasing a specific rigidity.

The solid solution phase represented by the formula: $Mg_aLi_bFe_cAl_dSi_eO_f$, according to this invention can be synthesized by forming in a required shape a mixed powder of compounds prepared in prescribed molar ratios, and sintering the formed body thereby causing the component compounds of the mixed powder to react in the course of sintering. Otherwise, the solid solution of $Mg_aLi_bFe_cAl_dSi_eO_f$ may be synthesized in advance by causing the mixed powder in a state neither formed nor sintered to be subjected to such steps as mixing, calcining, groundings, or electromelting. The raw materials which are usable herein may be known raw materials containing the elements of Mg, Li, Fe, Al, Si, O such as, for example, magnesium oxide (MgO) powder, magnesium hydroxide $(Mg(OH)_2)$ powder, lithium oxide $(Li_2O)$ powder, lithium carbonate $(Li_2CO_3)$ powder, iron oxide $(Fe_2O_3, Fe_3O_4)$ powder, aluminum oxide $(Al_2O_3)$ powder, silicon oxide $(SiO_2)$ powder, spinel $(MgAl_2O_4)$ powder, spodumene $(LiAlSi_2O_6)$ powder, and petalite $(LiAlSi_4O_{10})$ powder. These raw materials may be arbitrarily combined so long as they form a solid solution having the variable "a" to "f" of the formula: $Mg_aLi_bFe_cAl_dSi_eO_f$ representing the solid solution according to this invention in the respectively prescribed ranges.

The low thermal expansion and high rigidity ceramic sintered body obtained by this invention may assume as a crystal structure a hexagonal close-packed structure and comprise solid solution crystal grains represented substantially by the formula: $Mg_aLi_bFe_cAl_dSi_eO_f$ (wherein a is in the range of 1.8 to 1.9, b is in the range of 0.1 to 0.3, c is in the range of 0 to 0.2, d is in the range of 3.9 to 4.1, e is in the range of 6.0 to 7.0, and f is in the range of 19 to 23). The lattice constants of the solid solution crystal grains may preferably in such ranges, i.e., $a_0$ in the range of 9.774 to 9.804 Å and $c_0$ in the range of 9.286 to 9.330 Å. More preferably, the ceramic sintered body mentioned above may have relative density of not less than 98%. As the result of the combination of these sets of conditions, the sintered body can manifest such an extremely low thermal expansion coefficient of not more than $0.1\times10^{-6}/°C$. as the absolute value at near a room temperature at which the relevant member of the sintered body may be used at a high frequency and at the same time, the specific rigidity represented by a ratio of Young's modulus to specific gravity can be as high as not less than 45 $GPa/g/cm^3$. Thus, the problems of this invention which resides in obtaining a sintered body excelling in thermal and mechanical stability by manifesting a low thermal expansion coefficient while maintaining a high specific rigidity can be solved.

EXAMPLE

Now, working examples of this invention will be described below together with comparative examples.

Raw material powders selected from the group consisting of magnesium oxide (MgO) powder (average particle diameter of 0.2 μm), magnesium hydroxide $(Mg(OH)_2)$ powder (average particle diameter of 0.5 μm), lithium oxide $(Li_2O)$ powder (average particle diameter of 1 μm), lithium carbonate $(Li_2CO_3)$ powder (average particle diameter of 2 μm), iron oxide $(Fe_2O_3)$ powder (average particle diameter of 3 μm), iron oxide $(Fe_3O_4)$ (average particle diameter of 3 μm), aluminum oxide $(Al_2O_3)$ powder (average particle diameter of 0.6 μm), silicon oxide $(SiO_2)$ powder (average particle diameter of 0.5 μm), spodumene $(LiAlSi_2O_6)$ powder (average particle diameter of 5 μm), and petalite (LiAlSi$_4$O$_{10}$) powder (average particle diameter of 4 μm) were formulated in each the ratios shown in Table 1, mixed with water as a medium in a ball mill for four hours to obtain a mixed powder. Then, the mixed powder thus obtained was dried, formed in an expected shape, and sintered. The forming was carried out with a cold hydrostatic pressure under a pressure of 140 MPa to afford a plate measuring 60×60 ×15 mm. The sintering was carried out in an open air under a normal pressure (kept at a sintering temperature in the range of 1250 to 1420° C. for 2 to 12 hours).

For the quantitative analysis of the solid solution phase of Mg$_a$Li$_b$Fe$_c$Al$_d$Si$_e$O$_f$ in the produced sintered body for the molar ratio, an inductively coupled plasma emission spectral analyzer (ICP method) was used. The crystal structures of a main crystal phase and an auxiliary crystal phase in the sintered body were determined by subjecting the ground surface of the sintered body to the X-ray diffraction analysis, in which the lattice constant, $a_0$, of the main crystal phase was decided from the lattice spacing of the (110) plane obtained by the analysis and the lattice constant, $c_0$, from the lattice spacing of the (002) plane. The specific gravity and the relative density of the sintered body were measured and calculated in accordance with the Archimedian law. The thermal expansion coefficient at near a room temperature was measured as an average thermal expansion coefficient at 20 to 25° C. in accordance with JIS (Japanese Industrial Standard) R3251 using a laser thermal expansion meter of dual light path Michaelson type laser interference type. The Young's modulus was measured by an ultrasonic pulse method at a room temperature in accordance with JIS-R1602. The specific rigidity was found as the quotient of the Young's modulus to be divided by the specific gravity.

The test results are shown in Table 1 together with the compositions of the relevant sintered bodies.

It is clearly noted from the table that the low thermal expansion ceramic sintered bodies of this invention comprise hexagonal solid solution crystal grains represented by the formula: Mg$_a$Li$_b$Fe$_c$Al$_d$Si$_e$O$_f$ (wherein a is in the range of 1.8 to 1.9, b is in the range of 0.1 to 0.3, c is in the range of 0 to 0.2, d is in the range of 3.9 to 4.1, e is in the range of 6.0 to 7.0, and f is in the range of 19 to 23), have lattice constants in such ranges, i.e., $a_0$ in the range of 9.774 to 9.804 Å and $c_0$ in the range of 9.286 to 9.330 Å, and show a relative density of not less than 98%, extremely lower thermal expansion coefficients of not more than 0.1×10$^{-6}$/°C. in absolute value at near a room temperature than comparative examples, as well as manifesting high specific rigidities, i.e. magnitudes represented by the ratio of Young's modulus to specific gravity, of not less than 45 GPa/g/cm$^3$, indicating that the sintered bodies of this invention ensure low thermal expansion while maintaining high specific rigidity. It is further noted that the samples suffering the presence of a tetragonal β-spodumene phase, a hexagonal cordierite phase, or a cubic spinel phase as a second phase (an auxiliary crystal phase) as shown in comparative examples had large thermal expansion coefficients and were deficient in specific rigidity.

TABLE (1)

|  | No. | MgO mass % | Mg(OH)$_2$ mass % | Li$_2$O mass % | Li$_2$CO$_3$ mass % | Fe$_2$O$_3$ mass % | Fe$_3$O$_4$ mass % | Al$_2$O$_3$ mass % | SiO$_2$ mass % | LiAlSi$_2$O$_6$ mass % | LiAlSi$_4$O$_{10}$ mass % |
|---|---|---|---|---|---|---|---|---|---|---|---|
| Example | 1 | 11.2 | — | 0.5 | — | — | 0.8 | 30.1 | 57.4 | — | — |
|  | 2 | 11.4 | — | — | — | — | — | 28.8 | 54.8 | 5.0 | — |
|  | 3 | — | 15.0 | 0.3 | — | 1.1 | — | 28.4 | 55.2 | — | — |
|  | 4 | 10.2 | — | — | 1.5 | 2.1 | — | 28.0 | 58.2 | — | — |
|  | 5 | — | 15.6 | — | — | — | 0.8 | 27.3 | 51.3 | 5.0 | — |
|  | 6 | — | 15.9 | 0.3 | — | 1.2 | — | 29.4 | 53.2 | — | — |
|  | 7 | 10.6 | — | — | — | 1.7 | — | 27.2 | 49.8 | — | 10.7 |
|  | 8 | 11.4 | — | — | — | — | 0.6 | 30.4 | 54.4 | 3.2 | — |
|  | 9 | — | 15.1 | — | 1.2 | 0.5 | — | 28.0 | 55.2 | — | — |
| Control | 10 | 13.8 | — | — | — | — | — | 34.9 | 51.3 | — | — |
|  | 11 | — | 16.7 | 0.1 | — | — | — | 30.0 | 53.2 | — | — |
|  | 12 | 11.9 | — | — | — | 1.o | — | 30.0 | 44.1 | 13.0 | — |
|  | 13 | 10.1 | — | — | — | — | 0.6 | 29.2 | 45.6 | — | 14.5 |
|  | 14 | — | 18.2 | 0.1 | — | 1.2 | — | 32.3 | 48.2 | — | — |
|  | 15 | 9.7 | — | — | — | — | 5.6 | 30.7 | 49.6 | 4.4 | — |
|  | 16 | 12.3 | — | 0.8 | — | — | — | 38.9 | 48.0 | — | — |
|  | 17 | 6.2 | — | — | — | 1.2 | — | 28.5 | 61.8 | — | 2.3 |
|  | 18 | — | 17.0 | — | — | 0.4 | — | 30.3 | 50.1 | 2.2 | — |

TABLE (2)

|  |  | Crystal structure of sintered body | | Lattic constant of main crystal | | Values of variables, "a" to "f", of solid solution phase of Mg$_a$Li$_b$Fe$_c$Al$_d$Si$_e$O$_f$* | | | | | |
|---|---|---|---|---|---|---|---|---|---|---|---|
|  | No. | Main crystal | Auxiliary crystal | $a_0$ (Å) | $c_0$ (Å) | a | b | c | d | e | f |
| Example | 1 | Hexagonal[1] | None | 9.778 | 9.3.10 | 1.88 | 0.23 | 0.08 | 4.00 | 6.48 | 21.03 |
|  | 2 | Hexagonal[1] | None | 9.778 | 9.290 | 1.90 | 0.18 | 0.00 | 3.98 | 6.50 | 20.96 |
|  | 3 | Hexagonal[1] | None | 9.776 | 9.320 | 1.85 | 0.15 | 0.10 | 4.02 | 6.63 | 21.32 |
|  | 4 | Hexagonal[1] | None | 9.800 | 9.290 | 1.80 | 0.29 | 0.19 | 3.91 | 6.90 | 21.80 |
|  | 5 | Hexagonal[1] | None | 9.802 | 9.288 | 1.90 | 0.11 | 0.05 | 4.05 | 6.15 | 20.38 |

TABLE (2)-continued

| | No. | Crystal structure of sintered body | | Lattic constant of main crystal | | Values of variables, "a" to "f", of solid solution phase of $Mg_aLi_bFe_cAl_dSi_eO_f$* | | | | | |
|---|---|---|---|---|---|---|---|---|---|---|---|
| | | Main crystal | Auxiliary crystal | $a_0$ (Å) | $c_0$ (Å) | a | b | c | d | e | f |
| Control | 6 | Hexagonal[1] | None | 9.778 | 9.290 | 1.87 | 0.15 | 0.10 | 3.95 | 6.05 | 20.07 |
| | 7 | Hexagonal[1] | None | 9.802 | 9.290 | 1.88 | 0.25 | 0.15 | 4.08 | 6.95 | 22.18 |
| | 8 | Hexagonal[1] | None | 9.776 | 9.320 | 1.81 | 0.11 | 0.05 | 3.92 | 6.01 | 19.82 |
| | 9 | Hexagonal[1] | None | 9.778 | 9.312 | 1.89 | 0.23 | 0.05 | 4.00 | 6.70 | 21.46 |
| | 10 | Hexagonal[2] | None | 9.770 | 9.352 | — | — | — | — | — | — |
| | 11 | Hexagonal[1] | None | 9.774 | 9.340 | 1.95 | 0.05 | 0.00 | 4.01 | 6.05 | 20.09 |
| | 12 | Hexagonal[2] | Tetragonal[3] | 9.772 | 9.346 | — | — | — | — | — | — |
| | 13 | Hexagonal[1] | Hexagonal[4] | 9.776 | 9.320 | 1.75 | 0.33 | 0.05 | 4.00 | 5.30 | 18.57 |
| | 14 | Hexagonal[1] | Cubic[5] | 9.776 | 9.340 | 1.85 | 0.05 | 0.10 | 3.96 | 5.80 | 19.52 |
| | 15 | Hexagonal[1] | None | 9.806 | 9.284 | 1.55 | 0.15 | 0.45 | 4.01 | 5.60 | 19.29 |
| | 16 | Hexagonal[1] | Cubic[5] | 9.772 | 9.346 | 1.88 | 0.35 | 0.00 | 5.00 | 5.60 | 20.76 |
| | 17 | Hexagonal[1] | Hexagonal[4] | 9.806 | 9.284 | 1.05 | 0.05 | 1.00 | 3.85 | 7.20 | 22.25 |
| | 18 | Hexagonal[1] | None | 9.772 | 9.348 | 1.93 | 0.08 | 0.03 | 4.02 | 5.70 | 19.43 |

*Values are entered only when a solid solution phase of $Mg_aLi_bFe_cAl_dSi_eO_f$ is present in the sintered body.
[1] solid solution phase of $Mg_aLi_bFe_cAl_dSi_eO_f$;
[2] α-cordierite phase;
[3] β-spodumene phase;
[4] μ-cordierite phase;
[5] spinel phase.

TABLE (3)

| | No. | Specific gravity g/cm³ | Relative density % | Thermal expansion coefficient (20 to 25° C.) × $10^{-6}$/° C. | Young's modulus GPa | Specific rigidity GPa/g/cm³ |
|---|---|---|---|---|---|---|
| Example | 1 | 2.38 | 99 | 0.05 | 120 | 50.4 |
| | 2 | 2.41 | 99 | −0.01 | 130 | 53.9 |
| | 3 | 2.39 | 99 | 0.00 | 127 | 53.1 |
| | 4 | 2.37 | 98 | 0.08 | 114 | 48.1 |
| | 5 | 2.47 | 99 | 0.02 | 139 | 56.3 |
| | 6 | 2.43 | 99 | −0.02 | 133 | 54.7 |
| | 7 | 2.38 | 99 | 0.09 | 113 | 47.5 |
| | 8 | 2.48 | 99 | 0.01 | 131 | 52.8 |
| | 9 | 2.40 | 99 | 0.07 | 122 | 50.8 |
| Control | 10 | 2.50 | 99 | 0.43 | 135 | 54.0 |
| | 11 | 2.41 | 99 | 0.13 | 127 | 52.7 |
| | 12 | 2.30 | 98 | 0.17 | 99 | 43.0 |
| | 13 | 2.24 | 90 | 0.25 | 80 | 35.7 |
| | 14 | 2.28 | 93 | 0.31 | 87 | 38.2 |
| | 15 | 2.53 | 95 | 0.18 | 109 | 43.1 |
| | 16 | 2.51 | 99 | 0.15 | 110 | 43.8 |
| | 17 | 2.56 | 98 | 0.22 | 118 | 46.1 |
| | 18 | 2.23 | 89 | 0.05 | 83 | 37.2 |

INDUSTRIAL APPLICABILITY

This invention permits the provision of a low thermal expansion and high rigidity ceramic sintered body having conspicuously improved thermal and mechanical stability by decreasing a thermal expansion coefficient at near a room temperature while maintaining a high specific rigidity. Thus, the present invention can enjoy unusually high industrial applicability.

What is claimed is:

1. A low thermal expansion and high rigidity ceramic sintered body characterized by assuming as a crystal structure a hexagonal close-packed structure and substantially comprising solid solution crystal grains represented by the formula: $Mg_aLi_bFe_cAl_dSi_eO_f$; wherein a is in the range of 1.8 to 1.9, b is in the range of 0.1 to 0.3, c is in the range of 0 to 0.2, d is in the range of 3.9 to 4.1, e is in the range of 6.0 to 7.0, and f is in the range of 19 to 23.

2. A low thermal expansion high specific rigidity ceramic sintered body according to claim 1, wherein the lattice constants of said solid solution crystal grains are in the ranges, $a_0$ in the range of 9.774 to 9.804 Å and $c_0$ in the range of 9.286 to 9.330 Å.

3. A low thermal expansion high specific rigidity ceramic sintered body according to claim 1, wherein the relative density of said sintered body is not less than 98%.

* * * * *